US 012524539B2

(12) United States Patent
Gazit et al.

(10) Patent No.: US 12,524,539 B2
(45) Date of Patent: Jan. 13, 2026

(54) LLM-POWERED THREAT MODELING

(71) Applicant: Microsoft Technology Licensing, LLC, Redmond, WA (US)

(72) Inventors: Tiferet Ahavah Gazit, Albany, CA (US); Aditya Sharad, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 18/384,954

(22) Filed: Oct. 30, 2023

(65) Prior Publication Data
US 2025/0139243 A1    May 1, 2025

(51) Int. Cl.
*G06F 21/56*    (2013.01)
*G06N 3/09*    (2023.01)

(52) U.S. Cl.
CPC ............. *G06F 21/563* (2013.01); *G06N 3/09* (2023.01); *G06F 2221/033* (2013.01)

(58) Field of Classification Search
CPC .... G06F 21/563; G06F 2221/033; G06N 3/09
See application file for complete search history.

(56) References Cited

U.S. PATENT DOCUMENTS

| | | | | |
|---|---|---|---|---|
| 9,754,112 | B1* | 9/2017 | Moritz | G06F 21/54 |
| 12,204,644 | B1* | 1/2025 | Cocea | G06F 21/562 |
| 12,314,690 | B2* | 5/2025 | Ye | G06F 8/74 |
| 2023/0418815 | A1* | 12/2023 | Zorn | G06F 8/10 |
| 2024/0028312 | A1* | 1/2024 | Gillman | G06N 3/0455 |
| 2024/0202405 | A1* | 6/2024 | Lang | G06F 30/27 |
| 2024/0330480 | A1* | 10/2024 | Roytman | G06F 16/9024 |
| 2024/0403438 | A1* | 12/2024 | Chan | G06N 3/044 |
| 2024/0403545 | A1* | 12/2024 | Nahum | G06F 3/0481 |
| 2024/0411666 | A1* | 12/2024 | Chan | G06F 21/577 |
| 2025/0028818 | A1* | 1/2025 | Kim | G06F 21/552 |
| 2025/0028823 | A1* | 1/2025 | Kim | G06F 21/563 |

(Continued)

FOREIGN PATENT DOCUMENTS

| | | |
|---|---|---|
| CN | 113779590 A | 12/2021 |
| CN | 112835620 B | 3/2022 |

OTHER PUBLICATIONS

Ahmed, et al., "Improving Few-shot Prompts with Relevant Static Analysis Products", Aug. 29, 2023, pp. 1-12.

(Continued)

*Primary Examiner* — Gary S Gracia
(74) *Attorney, Agent, or Firm* — Workman Nydegger (57) ABSTRACT

Techniques for implementing an AI threat modeling tool are disclosed. A static analysis tool is used to extract a candidate code snippet from a code repository. The candidate code snippet is identified as potentially being a security relevant code element. The static analysis tool generates additional context associated with the candidate code snippet. An LLM prompt is generated. This prompt is structured to include the candidate code snippet, the context, and a directive to assign a classification to the candidate code snippet. The classification includes a source classification, a sink classification, a sanitizer classification, or a flow step classification. The LLM operates on the prompt to generate output comprising a specific classification for the candidate code snippet. The output is formatted into a data extension file that is consumable by the static analysis tool.

20 Claims, 4 Drawing Sheets

(56) References Cited

U.S. PATENT DOCUMENTS

| | | | |
|---|---|---|---|
| 2025/0028825 A1* | 1/2025 | Kim | G06F 21/552 |
| 2025/0028826 A1* | 1/2025 | Kim | G06F 21/565 |
| 2025/0028827 A1* | 1/2025 | Kim | G06F 21/552 |
| 2025/0030704 A1* | 1/2025 | Kim | H04L 63/1416 |
| 2025/0036778 A1* | 1/2025 | Chan | G06F 21/577 |
| 2025/0097237 A1* | 3/2025 | Parla | H04L 63/1433 |
| 2025/0117480 A1* | 4/2025 | Wagh | G06N 3/0455 |
| 2025/0123814 A1* | 4/2025 | Mcmorran | G06N 3/044 |
| 2025/0139243 A1* | 5/2025 | Gazit | G06F 21/563 |
| 2025/0240313 A1* | 7/2025 | Zhang | H04L 41/16 |

OTHER PUBLICATIONS

International Search Report and Written Opinion received for PCT Application No. PCT/US2024/049684, Dec. 6, 2024, 15 pages.

Liu, et al., "Harnessing the Power of LLM to Support Binary Taint Analysis", arxiv.org, Cornell University Library, 201 Olin Library Cornell University Ithaca, NY 14853, Oct. 12, 2023, 12 pages.

Pearce, et al., "Can OpenAI Codex and Other Large Language Models Help Us Fix Security Bugs?", arxiv.org, Cornell University Library, 201 Olin Library Cornell University Ithaca, NY 14853, Dec. 3, 2021, 16 pages.

Dv, Raja Rao, "Using AI to write secure code with Semgrep", Retrieved from: https://semgrep.dev/blog/2023/using-ai-to-write-secure-code-with-semgrep/, Apr. 4, 2023, 9 Pages.

Lysenko, Mikola, "Introducing Socket AI—ChatGPT-Powered Threat Analysis", Retrieved from: https://socket.dev/blog/introducing-socket-ai-chatgpt-powered-threat-analysis, Mar. 31, 2023, 7 Pages.

Pistoia, et al., "Combining Static Code Analysis and Machine Learning for Automatic Detection of Security Vulnerabilities in Mobile Apps", In Book Mobile Application Development, Usability, and Security, Jan. 1, 2017.

Tiferet Gazit, "github / codeql", Retrieved from: https://github.com/github/codeql/blob/tiferet/codex/java/ql/experimental/adaptivethreatmodeling/src/ExtractSinkCandidates.ql, Mar. 16, 2023, 2 Pages.

* cited by examiner

LLM-POWERED THREAT MODELING

BACKGROUND

"GitHub CodeQL" is a static code analysis tool that can be used to discover vulnerabilities and other issues within a codebase. For example, CodeQL can be used to identify and surface security alerts. These alerts may correspond to a vulnerability consisting of a "source" (i.e. a portion of code that allows "tainted" input to enter the system), a "sink" (i.e. a location where the tainted data is used in a potentially dangerous way), and zero or more "flow steps" connecting them (where each flow step is a single step in the process that allows the taint to flow from the source to the sink). These alerts may exclude non-vulnerable code for which all flow paths from the source to the sink pass through a "sanitizer" (i.e. a portion of code that ensures that any data passing through it is no longer tainted). More specifically, sanitizers are entities that remove a taint from data. For instance, if there is a flow path from a source to a sink, but a sanitizer exists therebetween, that path does not constitute a vulnerability. As another example, a SQL injection might consist of a user-supplied username with a flow path to a method that reads information about that user from a SQL database. A sanitizer may consist of a method that checks whether the username is one of a specified set of usernames that this user is allowed to access and, if not, the SQL query will not be run.

One major pain point with analyzing code relates to the process of mapping out, or "threat modeling", a framework library (e.g., an open source repository) to identify the sources, sinks, sanitizers, and flow steps. Historically, this mapping process has been extremely labor intensive and often involved countless hours of manual effort. Furthermore, the code in open source repositories is constantly growing. Keeping up with this growth (e.g., in terms of performing the manual mapping) has been exceptionally challenging. Even harder is performing such mapping on private repositories because that work needs to be done by security experts within the organization that owns the private repositories. The volume of private repositories is also growing at a high rate.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method for implementing an artificial intelligence (AI) threat modeling tool, said method including: using a static analysis tool to extract a candidate code snippet from a code repository, wherein the candidate code snippet is identified by the static analysis tool as potentially being a security relevant code element; using the static analysis tool to generate additional context associated with the candidate code snippet; generating a large language model (LLM) prompt, which is structured to include the candidate code snippet, the context, and a directive to assign a classification to the candidate code snippet, said classification including a source classification, a sink classification, a sanitizer classification, or a flow step classification, and wherein the directive optionally further includes a directive to determine a type for the classification; triggering the LLM to operate on the LLM prompt, wherein, as a result of said operating, the LLM generates output including a specific classification for the candidate code snippet and optionally a specific type for the specific classification; optionally formatting the output of the LLM into a data extension file that is consumable by the static analysis tool; and optionally including the data extension file in a corpus of data extension files that are consumable by the static analysis tool.

In some aspects, the techniques described herein relate to a computer system including: a processor system; and a storage system that includes instructions that are executable by the processor system to cause the computer system to: use a static analysis tool to extract a candidate code snippet from a code repository, wherein the candidate code snippet is identified by the static analysis tool as potentially being a security relevant code element; use the static analysis tool to generate additional context associated with the candidate code snippet; generate a large language model (LLM) prompt, which is structured to include the candidate code snippet, the context, and a directive to assign a classification to the candidate code snippet, said classification including a source classification, a sink classification, a sanitizer classification, or a flow step classification, and wherein the directive further includes a directive to determine a type for the classification; trigger the LLM to operate on the LLM prompt, wherein, as a result of said operating, the LLM generates output including a specific classification for the candidate code snippet and a specific type for the specific classification; format the output of the LLM into a data extension file that is consumable by the static analysis tool; and include the data extension file in a corpus of data extension files that are consumable by the static analysis tool.

In some aspects, the techniques described herein relate to a method for implementing an artificial intelligence (AI) threat modeling tool, said method including: using a static analysis tool to extract a candidate code snippet from a code repository, wherein the candidate code snippet is identified by the static analysis tool as potentially being a security relevant code element; using the static analysis tool to generate additional context associated with the candidate code snippet; generating a large language model (LLM) prompt, which is structured to include the candidate code snippet, the context, and a directive to assign a classification to the candidate code snippet, said classification including a source classification, a sink classification, a sanitizer classification, or a flow step classification; triggering the LLM to operate on the LLM prompt, wherein, as a result of said operating, the LLM generates output including a specific classification for the candidate code snippet; and formatting the output of the LLM into a data extension file that is consumable by the static analysis tool.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The disclosed embodiments automate the detection (and facilitate the resolution) of vulnerabilities, or rather potential security relevant code elements (aka "threat models"), within a codebase. Once security-relevant code elements are identified, a static analysis tool can combine this information with control flow analysis and data flow analysis to identify security vulnerabilities involving those code elements.

One objective of the disclosed embodiments is to attempt to find all or a subset of the security relevant code elements within a given codebase. Historically, manual mapping has not scaled up sufficiently to cover all relevant code elements in all commonly used frameworks and libraries, resulting in too high of a false negative rate. The disclosed embodiments, on the other hand, are configured to better detect security relevant code elements at scale and are configured to better detect vulnerabilities by effectively casting a larger detection net. Doing so may result in an initial set of increased false positives (as compared to traditional techniques), but that outcome is acceptable because the embodiments are able to perform additional filtering, heuristic, or manual analysis. The embodiments also facilitate improved feedback learning of the AI application, by expanding the set of examples that can optionally be included in the LLM prompt.

The embodiments are highly configurable and, depending on the desired level of recall or precision, the embodiments can fully automate the detection process or at least semi-automate the detection process. In particular, the embodiments are designed to detect sources, sinks, sanitizers, and potential flow steps within a codebase.

The embodiments achieve the above objectives by implementing an artificial intelligence (AI) powered threat modeling system, which can beneficially expand the coverage of CodeQL, or any static analysis tool. In particular, the disclosed embodiments help CodeQL recognize more security-relevant elements of a codebase, thereby improving CodeQL's ability to detect security vulnerabilities in that codebase as well as other codebases that rely on it, and to reduce the false-negative rate of CodeQL queries that detect security vulnerabilities. The embodiments use a combination of CodeQL and a large language model (LLM) to automatically detect sources, sinks, sanitizers, and flow steps. The embodiments then optionally make this information available to CodeQL queries. The Code QL queries then combine that information with existing code analysis capabilities and previously known security-relevant elements to identify security vulnerabilities in code.

Threat modeling can be formulated as a classification problem. For example, given a code snippet (e.g., an argument to a method), the classification problem involves how to classify that code snippet as a specific type of sink, a specific type of source, a specific type of flow step, a specific type of sanitizer, or none of the above.

The embodiments are beneficially designed to solve that classification problem. To do so (as mentioned above), the embodiments first trigger the use of CodeQL queries designed to extract candidate code snippets from a given code repository and heuristically filter out a subset of those candidates as irrelevant. For example, if it is desirable to model all sinks in a given framework, the embodiments extract all parameters of method declarations, filter some out with a set of heuristic rules. On the other hand, if it is desirable to model all sinks used by a given application, the embodiments extract all arguments to external application programming interface (API) calls, again filtering out whatever possible. The coverage can be increased by including other structures, including fields, qualifiers, and return values.

The embodiments also use CodeQL to extract positive and negative examples for few-shot prompting of the large language model (LLM). To illustrate, positive examples may include sinks, sources, sanitizers, or taint steps that have already been manually modeled. Negative examples may include entities that are known to never be sinks, sources, sanitizers, or taint steps, or that are uninteresting to model (e.g., such as exceptions or code snippets that sit in test files).

Then, the embodiments use the information extracted from CodeQL to formulate a prompt for the LLM. Depending on the LLM used, the embodiments frame a suitable prompt to communicate the relevant code snippet and selected additional context associated with it, as well as a description of the task and optionally a selection of few-shot examples. The embodiments trigger or prompt the model (e.g., the LLM) to return a string indicating the LLM's classification of the code element as a specific type of sink, a specific type of source, a specific type of flow step, a specific type of sanitizer, or none of the above.

Advantageously, the disclosed techniques can be generalized to any type of LLM, including both completion-based and chat-based models, as well as domain-specific code completion models. This generalization can be performed by adapting the framing of the prompt. For example, other formats for the prompt can be used, such as a markdown table, chat styles, simulated code, or any other prompt style. Similarly, any type of static analysis tool can be used.

In this regard, the disclosed embodiments bring about numerous benefits, advantages, and practical applications to the technical field of code management, and particularly to the field of detecting security relevant code elements and static application security testing. In particular, the embodiments are beneficially able to detect security relevant code elements within a codebase in an automated manner. By performing the disclosed operations, the embodiments not only improve how code is developed, but they also improve how code is managed. The embodiments also significantly improve the security of the underlying computer system.

That is, by detecting and facilitating the resolution of security relevant code elements, the operations of the computer system will be safeguarded, thereby enabling the computer system to operate in a more reliable, secure, and robust manner.

As recited above, the disclosed techniques can be used to improve security. That being said, these principles can also be used to improve overall code quality. For instance, the principles can be used to ensure that developers are following established coding practices or are developing code in a manner that conforms with a governing policy. In this sense, the disclosed techniques can not only be used in a security context but can also be generalized to improve overall code quality.

The embodiments are able to identify patterns in code and to map or analyze those patterns to determine the quality level of the code. That is, the embodiments can be used to map specific code within libraries or frameworks. The embodiments may then generate various queries to determine how candidate code snippets connect with other recognized code snippets or patterns. Accordingly, these and numerous other benefits will now be described in more detail throughout the remaining portions of this disclosure.

Example Architectures

Figure 1:
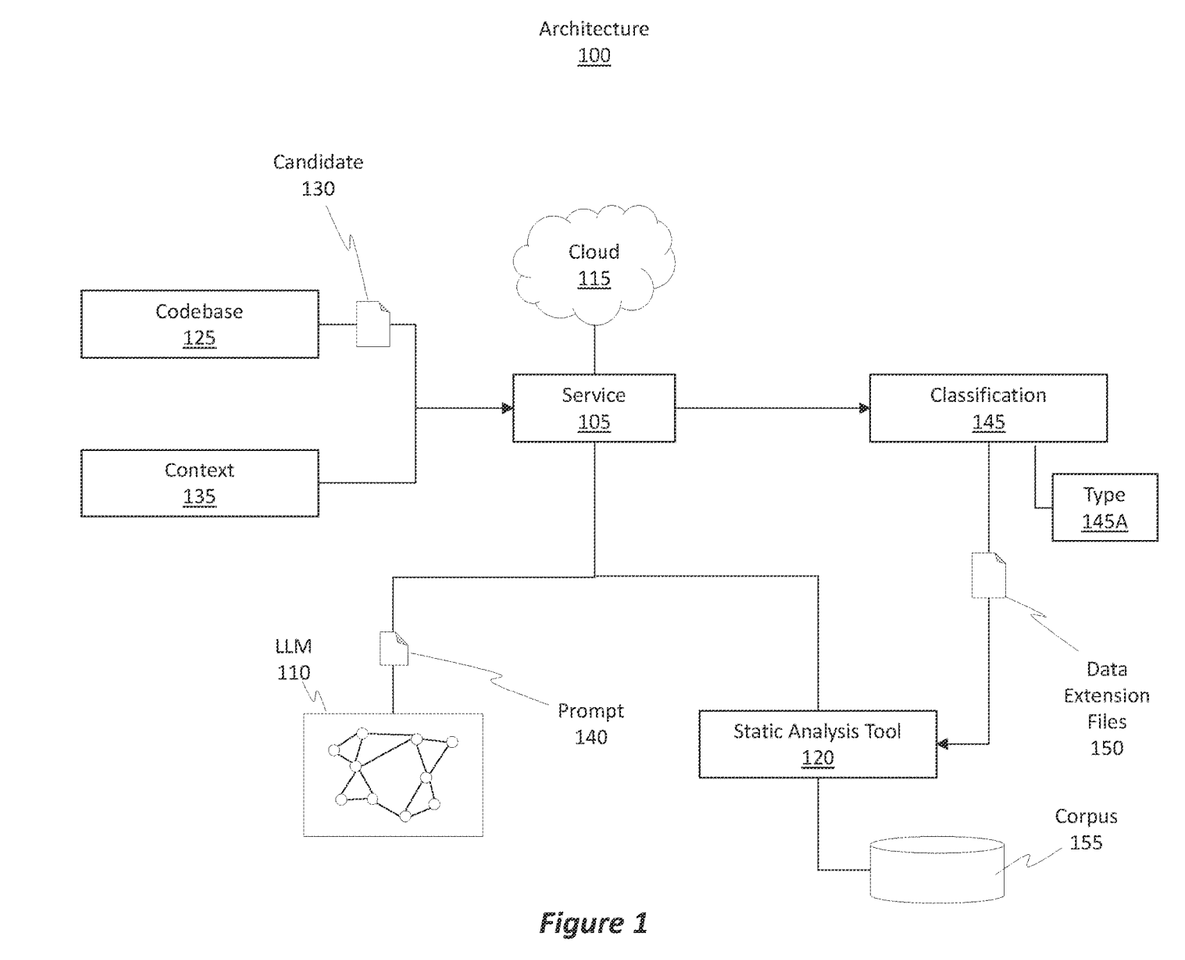
FIG. 1 illustrates an example architecture for implementing a threat model tool.

Having just described some of the high level benefits and advantages of the disclosed embodiments, attention will now be directed to FIG. 1. FIG. 1 illustrates a computing architecture 100 that can be used to achieve the above-described benefits. Architecture 100 is shown as including a service 105.

As used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine. The ML engine enables service 105 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Service 105 is shown as including or being associated with a large language model (LLM) 110. LLM 110 can be representative of the machine learning engine or artificial intelligence described above. LLM 110 is a type of neural network that uses various layers of nodes in a probabilistic manner. LLM 110 generates probabilities for words to form various groupings of words in response to prompts. LLM 110 can be a first-party LLM or a third-party LLM.

In some implementations, service 105 is a cloud service operating in a cloud environment 115. In some implementations, service 105 is a local service operating on a local device. In some implementations, service 105 is a hybrid service that includes a cloud component operating in the cloud and a local component operating on a local device. These two components can communicate with one another.

Service 105 is also shown as including a static analysis tool 120 (e.g., CodeQL). Service 105 uses the static analysis tool 120 to access a codebase 125 and to extract a candidate 130 code snippet, along with specified information about that candidate, from that codebase 125. Notably, service 105 is designed to obtain an over-expansive or overly-broad set of potential security relevant elements (e.g., candidate 130 being one of those elements).

In some cases, various filtering operations, or pre-filtering or other heuristic operations, can be performed when attempting to identify the security relevant code elements. These operations are designed to eliminate a subset of the false positives that were captured during the initial operations of analyzing the codebase 125. In some scenarios, pre-filtering can be performed to reduce the number of candidates and therefore the LLM compute costs. Another example of pre-filtering involves reducing the number of false positives, some of which may be easier to identify with heuristic filters during static analysis.

As one example, code snippets that have already been mapped out need not be remapped by the service 105. As a result, those code snippets can optionally be filtered from the analysis. As another example, it may be the case that certain frameworks are already known to not include vulnerabilities. Calls to APIs in those frameworks can also be filtered. As yet another example, it may be the case that certain test code is not relevant, and that test code can be filtered. Accordingly, service 105 can employ a set of filters to reduce the amount of data, thereby also reducing the subsequent number of calls to the LLM 110, which is tasked with classifying those potential security relevant elements. Thus, by performing these filtering and heuristic operations, the embodiments are able to intelligently reduce the amount of data that will be fed to the LLM 110, thereby also improving the operational efficiency and compute cost of the computing system.

Service 105 (e.g., via the static analysis tool 120) also accesses various example(s) (together with relevant information or features for each) or, more generally, context 135 associated with the candidate 130. The context 135 can include any type of data. As one example, context 135 can be content pulled from a selected number of code lines preceding the line or lines comprising the candidate 130. As another example, context 135 can be content pulled from a selected number of code lines succeeding the line or lines comprising the candidate 130. Thus, context 135 should be interpreted broadly and can include any type of supplemental data, including few-shot examples. For instance, context 135 can include positive and negative examples or other features. As another example, if the candidate is a method parameter, the context might include the parameter name as well as the method's name, signature, type or class name, and package.

Context 135 can include the doc string for the method (or the library defining the method) comprising the candidate 130. Method parameter information can be included in the context 135 as well. Code comments, code documentation, and other information about libraries, APIs, or methods related to the codebase 125 can also be included in the context 135.

It should be mentioned how, in some implementations, the static analysis tool 120 is able to extract the context 135. For example, in the scenario where the static analysis tool 120 takes the form of CodeQL, CodeQL is able to extract or otherwise obtain the context 135 from the codebase 125 for the candidate 130. It should also be mentioned that context can in general be extracted from the codebase itself and/or from other sources, such as the internet. In some scenarios, the codebase 125 and possibly other sources of context can operate as inputs to the service 105. The extraction of the candidate 130 and context 135 can optionally be included as a part of the service 105.

In some scenarios, service 105 (and in particular the static analysis tool 120) has access to underlying code while in other scenarios, the tool may not have access to the underlying code. Instead, the tool may have access to the code that calls a method comprising the candidate code snippet as opposed to the code for the method itself. Thus, in some scenarios, the embodiments extract candidate code snippets from calls to external API calls in a set of applications or programs while in other scenarios the embodiments extract code snippet from public methods in a framework/library itself, thereby modeling a framework by framework type of scenario (e.g., the embodiments can query an open source framework to look for API calls defined within that framework and the data that is desired to be obtained for the context 135).

In this manner, the embodiments are able to identify a rich set of semantic information about the candidate 130. Stated differently, information that is syntactically and/or semantically related to the candidate 130 can be included in the context 135. Accordingly, as used herein, the term "context" should be interpreted in a broad manner and may include any data, metadata, or any other information pulled from the codebase 125 and/or any data pulled from sources that are external to the codebase 125 (but which include data relevant to the candidate 130).

Information regarding how a method is called can also be included in the context 135. Additionally, external data can be included in the context 135. For example, release notes or changes notes can be queried to determine whether they include worthwhile contextual information that is to be included in the context 135.

Service 105 then formulates a prompt 140. Prompt 140 is structured by service 105 to include the context 135 and the current candidate 130 that is to be classified. In some implementations, the prompt 140 is a fillable template in which data can be entered into fields of the template. In other implementations, the prompt 140 is generated dynamically and in real-time by service 105. In this way, service 105 reframes the classification problem as a text generation and question answering problem, such that the text completion or chat response provided by the LLM 110 corresponds with the classification of the current candidate 130.

Some embodiments may limit the size of the prompt 140 based on technical limitations, design considerations, or operating considerations (e.g., cost) with respect to the LLM 110.

The prompt 140 may be further structured to include few-shot examples. These few-shot examples operate to guide the LLM 110 in a manner so as to generate a desired type of output.

As one example, a few-shot example can be generated and included in the prompt 140, where this few-shot example includes a definition or an example of what constitutes a source or what constitutes a sink or what constitutes a flow step or what constitutes a sanitizer. Negative examples can also be provided, such as an example of what does not constitute a source, a sink, a sanitizer, or a flow step.

Examples regarding the different types of sinks (e.g., this is a SQL type of sink) can also be provided, similar for sources, sanitizers, and flow steps. Few-shot examples are particularly beneficial for fine-grained distinctions that are to be used to help guide the analysis trajectory of the LLM 110. Few-shot examples are particularly beneficial to address both false positives and false negatives that are perhaps not as clear cut or clearly distinguishable or for which a community consensus has not been reached.

Few-shot examples can also be used to filter data. For instance, even though a particular unit of code may technically be a sink, that unit of code may not be of interest to a developer because that code is test code. If that is the case, a few-shot example can be prepared so that this unit of data will be prevented from being negatively classified by the LLM 110. Another potentially uninteresting sink may be one that is buried too deeply within a hierarchy and thus is not outward facing (and subject to malicious use).

The static analysis tool 120 can be configured to identify these few-shot examples. For instance, CodeQL can be configured to query any number of databases that contain previously modeled code snippets. CodeQL can then extract, from these example database, relevant examples (positive examples and/or negative examples) that can operate as few-shot examples in the prompt 140.

Optionally, the static analysis tool 120 can use previously recorded data to generate the few-shot examples and/or the static analysis tool 120 can use live data (e.g., code that is currently included in the codebase 125) to generate the few-shot examples. Few-shot examples can also optionally be manually selected. Optionally some few-shot examples can be hardcoded in the prompt. In the prompt, a rationale or explanation can be provided to inform the LLM 110 as to why an example is a positive example or a negative example.

Few-shot examples can also be used to guide the format of the LLM's output. Ultimately, service 105 will be tasked with parsing the output of the LLM so it can be integrated back into the static analysis tool 120 (e.g., in the form of data extension files 150). The few-shot examples can be used to guide the formatting of the LLM's output. The data extension files 150 can be viewed as being a corpus of reference data that is used by the static analysis tool 120 to enable it to perform its analysis operations. The newly generated data extension files 150 can be included in an existing corpus 155 of data extension files, some of which may include manual modeling information and some of which may have been generated via automatic techniques, such as those described herein.

In some scenarios, a single prompt is generated for each candidate code snippet. In other scenarios, a single prompt can batch multiple candidate code snippets together and trigger the LLM to generate classifications for each candidate in the batch. In some cases, multiple prompts might be generated for a single candidate, such as a feedback prompt scenario.

For example, a first prompt may be generated for a particular candidate, and the LLM may attempt to generate a classification. If that classification is incorrect, flawed, or otherwise needs further improvement, a feedback/second (or third, fourth, etc.) prompt can be generated with additional data and reasoning as to why additional processing is being requested.

The prompt 140 may also include some natural language instructions describing the goal or the objective of the LLM 110. For instance, the natural language instructions can describe the desired outcome of the LLM 110 and a statement on how the output is to be formatted, such as a statement that the LLM is to provide a type for the sink, source, sanitizer, and/or flow step and a rationale for that determination, in a specified format.

LLM 110 then operates based on the prompt 140. LLM 110 is tasked with classifying the candidate 130 as a sink, source, flow step, sanitizer, or something else. Additionally, LLM 110 is tasked with determining a type of the sink or a type of the source or a type of the flow step or a type of sanitizer.

As an example, a "type" for a sink may be a cross site scripting sink. This type of sink is one where data is being written to a web page. Another type of a sink may include a SQL injection sink or a query injection sink, both of which generally involve reading, writing, or deleting data in a database. Another example of a sink type is a command injection sink, which is where user-provided content will affect a code snippet that will then be executed. Yet another example type is a path injection sink, which is a file system path that will be read, written to, opened, or deleted. Of course, other types of sinks exist, and the above list should be recognized as not being exhaustive.

An example of a type of a source can be the origination of remote untrusted data that an attacker may try to send into an application. As another example, a type of a source can be user input into an application. Source types can be local or remote. The few-shot examples mentioned previously can include example types for sources, sinks, sanitizers, and flow steps. As such, the prompt can include examples for types, and the prompt may specify the goal for the LLM to provide the type.

In some implementations, the listing of few-shot examples can be structured in a manner so as to restrict the LLM 110 so that the LLM 110 is permitted to select classifications only from the examples provided in the prompt. In other implementations, the listing of few-shot examples is structured in a manner so as to provide additional flexibility for the LLM 110 to potentially select a classification that is not within the scope of the few-shot examples.

Service 105 then uses the resulting classification 145, which may further include a type 145A for that classification, to generate data extension files 150. Service 105 then optionally feeds these files 150 back into the static analysis tool 120 (e.g., into the corpus 155) to augment that tool's default analysis capabilities. The type 145A and the classification 145 can be included as a part of the data extension files 150. In some scenarios, these files may be automatically added into the static analysis tool, or they may first undergo manual verification and triage.

That is, the static analysis tool 120 (e.g., CodeQL) is designed to consume data extension files retained in the corpus 155, and those files can optionally be written in the YAML (yet another markup language) markup language or perhaps another language. These data extension files can provide additional information to the static analysis tool 120 regarding API functions in a specific format already understood by the tool. The static analysis tool 120 can be equipped with large collections of these data extension files (e.g., as shown by the corpus 155), and the embodiments are able to use AI-generated classifications (e.g., classification 145) to further augment the tool's modeling abilities.

In effect, service 105 provides a path to beneficially merging the new classifications (e.g., classification 145) into the data extension files of the static analysis tool 120 (included in the corpus 155). As a consequence, the static analysis tool 120 can use both manual and AI-generated modeling to identify more security-relevant code and security vulnerabilities, which in turn can be shown to developers. In parallel, the embodiments optionally enable customers to use the same auto-modeling technology to create custom data extensions that apply to their own private repositories, or to public repositories on which they rely. This can be achieved by service 105 providing a user experience (UX), optionally in an integrated development environment (IDE) or in a browser, so that the users can run the service 105, such as by implementing the auto-model operations, triage the resulting classifications, and including those classifications in the static analysis tool 120.

Figure 2:
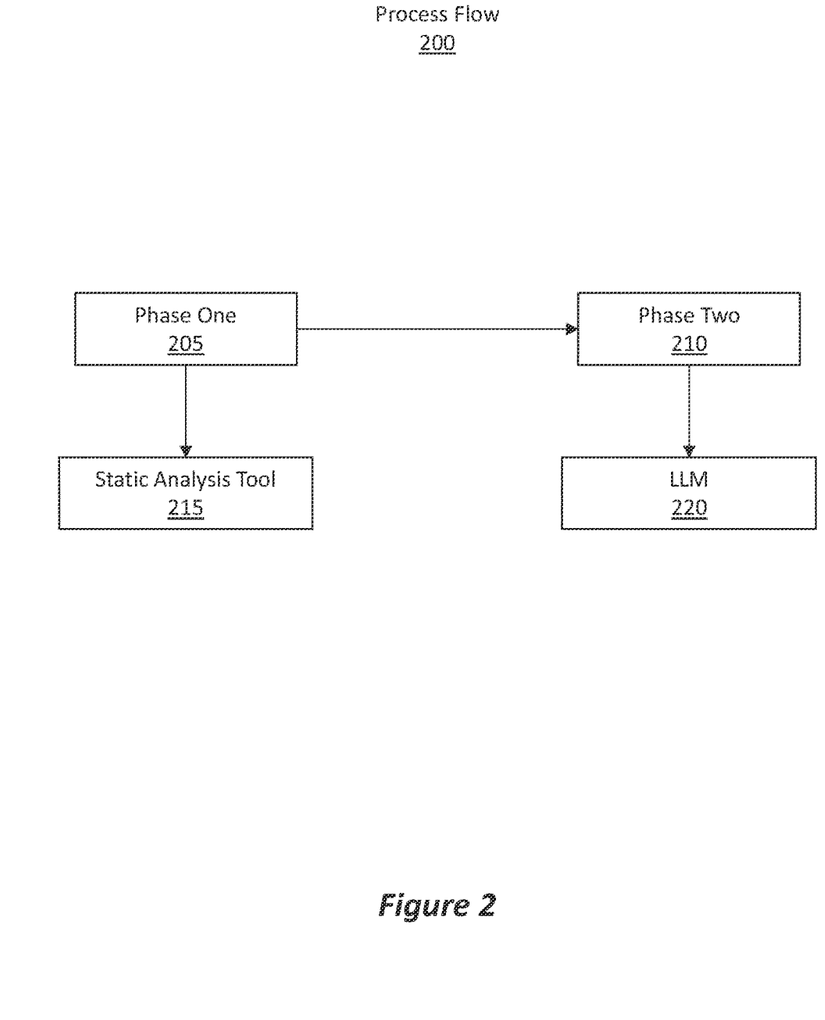
FIG. 2 illustrates an example process flow outlining how to implement the threat model tool.

FIG. 2 shows an example process flow 200 that can be performed by the service 105 of FIG. 1. Generally, process flow 200 includes two steps or two phases, as shown by phase one 205 and phase two 210.

Phase one 205 involves the use of the static analysis tool 215, which is representative of the static analysis tool 120 of FIG. 1. During phase one 205, the static analysis tool 215 is used to analyze a codebase and to identify, from within that codebase, one or more candidate code snippets that may potentially be a security relevant code element.

Phase two 210 generally involves preprocessing these candidates and optionally filtering them or reducing redundancy, generating an appropriate prompt for them, including context associated with the snippets and optionally few-shot examples, and feeding this prompt to an LLM 220. LLM 220 is representative of the LLM 110 from FIG. 1. The LLM 220 operates to classify those code snippets as a particular type of vulnerability or a particular type of security relevant code element. Those classifications can then be analyzed and post-processed, optionally manually triaged, and fed back to the static analysis tool 215 so the tool can improve its subsequent identification processes.

In some cases, post processing can be performed. As one example, suppose multiple calls to the LLM are being made with respect to the same candidate code snippet. It may be the case, however, that the context for that code snippet is different in each or at least some of the multiple calls. Some embodiments are configured to post process the results generated by the LLM in an attempt to resolve potential discrepancies or differences that might exist between the different outputs produced by the LLM. For instance, a voting mechanism can be implemented to vote amongst the various different outputs in an attempt to come to a single resolution. In some implementations, different weighting or expert knowledge can be incorporated so that the selected outcome is not strictly based on a simple majority selection.

The post processing can also include logic for formatting the output in a manner that is digestible by the static analysis tool. Recall, the classification output generated by the LLM is typically fed back to the static analysis tool in the form of one or more data extension files (which are to be included in a corpus of reference data used by the static analysis tool). Thus, post processing can be performed to ensure that the format of the data is sufficient for the static analysis tool to operate on that output. Thus, in various embodiments, post processing refinements can be performed on the LLM's output.

Optionally, the LLM may be tasked with formatting its output in the desired manner. As another option, separate post processing can be performed to reformat the LLM's output in the desired manner. In some implementations, a combination of those two options can also be performed.

As mentioned before, the embodiments can task the LLM with also providing a rationale for its classification decision. In effect, the embodiments can employ chain of thought reasoning with respect to the LLM. Requiring the LLM to provide a rationale has been shown, in experiments with the disclosed embodiments, to significantly improve the classification output generated by the LLM. Thus, significant advantages can be achieved by requiring chain of thought reasoning for the LLM.

The resulting data extension files that are produced include various threat models that are usable by the static analysis tool to perform its operations. It should be noted, however, how the models in the data extension files are different from the output of the queries that are initially run via the static analysis tool, and constitute the candidate code snippets (i.e. those potential security relevant code elements). The queries used to find the potential security relevant code elements are designed to be overly broad so as to capture all, or at least a substantial majority, of the potential security relevant code elements that exist in the codebase. By design, they output many candidates that are in fact not security relevant code elements. On the other hand, the models produced by the service and included in the data extension files are designed to be a significantly smaller subset of code elements, with most non-security relevant elements filtered out. Furthermore, these models generally include a type, which the candidates produced by the static analysis query did not have. The resulting detected threat models can be used to improve the analysis abilities of the static analysis tool.

It should also be noted how the queries that detect candidate code snippets differ from queries written to detect vulnerabilities in source code. The former are designed to detect potential sources, sinks, sanitizers, and flow steps; the latter are designed to connect such units together in order to detect or identify vulnerabilities (e.g., by connecting an identified source with an identified sink via a series of taint steps, thereby detecting a vulnerability). The former are part of the disclosed embodiments, while the latter can use the output of the embodiments much as they would use manually modeled sources, sinks, sanitizers, and taint steps, and are not specific to the disclosed embodiments. Thus, it should be appreciated how two distinct sets of queries are used by the disclosed static analysis tool.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
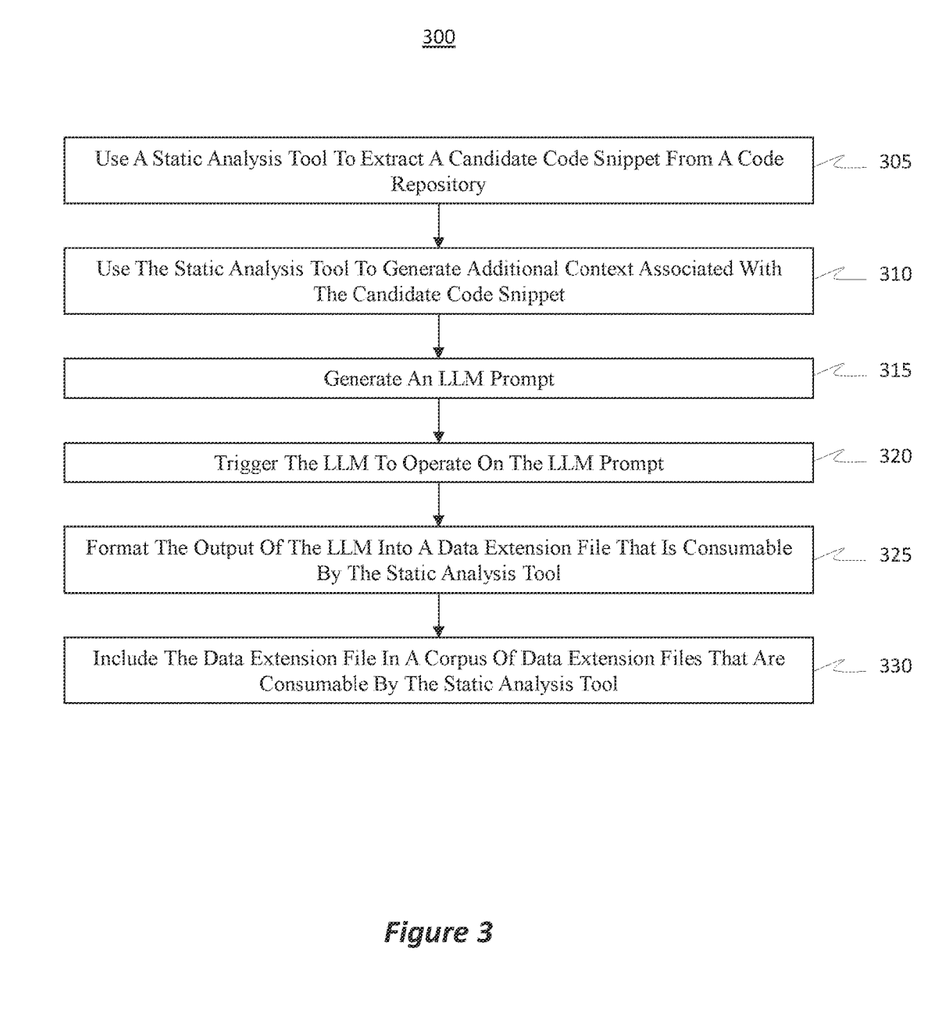
FIG. 3 illustrates a flowchart of an example method for classifying potential security relevant code elements.

Attention will now be directed to FIG. 3, which illustrates a flowchart of an example method 300 for implementing an artificial intelligence (AI) threat model tool. Method 300 can be implemented within the architecture 100 of FIG. 1. Furthermore, method 300 can be implemented by the service 105 of FIG. 1.

Method 300 includes an act (act 305) of using a static analysis tool (e.g., static analysis tool 120 from FIG. 1) to extract a candidate code snippet (candidate 130) from a code repository (e.g., codebase 125). The candidate code snippet is identified by the static analysis tool as potentially being a security relevant code element.

In some scenarios, the candidate code snippet is one of a plurality of candidate code snippets that are identified and extracted by the static analysis tool. Optionally, a pre-filtering operation is performed on those candidate code snippets using a defined set of parameters to reduce the number of candidate code snippets.

Act 310 includes using the static analysis tool to generate additional context (e.g., context 135) associated with the candidate code snippet. In some cases, the context includes one or more few-shot examples. These few-shot examples may include at least one of: a positive example of a corresponding sink, a positive example of a corresponding source, a positive example of a corresponding sanitizer, or a positive example of a corresponding flow step. These few-shot examples may further include at least one of: a negative example of a corresponding sink, a negative example of a corresponding source, a negative example of a corresponding sanitizer, or a negative example of a corresponding flow step. In some scenarios, some of the context may be extracted using other tools, such as a web search for the documentation of a candidate API call. Positive and negative examples for sanitizers can also be provided.

The context can also include documentation and/or code comments associated with the candidate code snippet. The context may further include content extracted from a selected number of code lines preceding or succeeding a code line comprising the candidate code snippet. In some cases, the context further includes information regarding how a function, which includes the candidate code snippet, is called.

Optionally, the context may include information obtained from a source that is external to the code repository, such as information pulled from a forum, social media site, release notes, and so on. As another option, the context may include multiple few-shot examples. A set of the few-shot examples may serve to affect the classification given to certain types of candidate code snippets by the LLM. For instance, the few-shot examples can be structured to operate as filters or pseudo-filters to prevent certain types of candidate code snippets from being classified as sinks, sources, sanitizers, or flow steps, resulting in the LLM labeling those snippets as none of the above. As one example, negative few-shot examples may encourage the LLM to assign negative classification to non-user-facing candidate code snippets. Furthermore, in some scenarios, one type of candidate code snippet is structured to encourage the LLM to classify a particular candidate code snippet that is not user-facing as not being a source or a sink.

Act 315 includes generating a large language model (LLM) prompt (e.g., prompt 140). This prompt is structured to include the candidate code snippet, the context, and an implicit or explicit directive to assign a classification to the candidate code snippet. This classification includes a source classification, a sink classification, a sanitizer classification, or a flow step classification. The directive may further include a directive to determine a type for the classification. Optionally, the prompt is generated in real-time. As another option, the prompt may be a fillable, pre-generated template. In some instances, the size of the prompt is limited by (or to) a threshold size.

In some cases, the prompt is a batch prompt that includes multiple candidate code snippets. In some cases, the prompt includes a single candidate code snippet. Optionally, the prompt may include additional natural language instructions for the LLM.

Act 320 includes triggering the LLM to operate on the LLM prompt. As a result of its operations, the LLM generates output comprising a specific classification (e.g., classification 145) for the candidate code snippet and a specific type (e.g., type 145A) for the specific classification.

Act 325 includes formatting the output of the LLM into a data extension file (e.g., data extension files 150). This file is consumable by the static analysis tool. The process of formatting the output of the LLM into the data extension file may include parsing the output and organizing the parsed output into a format that is consumable by the static analysis tool.

Act 330 then comprises inserting or including the data extension file in a corpus of data extension files. This corpus is consumable by the static analysis tool and operates to enhance or augment the analysis abilities of the static analysis tool. In some cases, inserting the data extension file into the corpus of data extension files may occur manually and/or after a triage event.

Accordingly, the disclosed techniques are beneficially configured to avoid having to directly ask the LLM to classify arbitrary code snippets as vulnerable or not vulnerable, which can lead to low-precision results. Instead, the embodiments use LLMs to classify the security relevance of each code snippet with a richer set of possible classifications (e.g. sources of untrusted data, sinks for a particular vulnerability type, flow steps that propagate data, or sanitizers that remove taint), and then pass those classifications back into a highly-precise static analysis tool that can consume them to expand its own analysis coverage capabilities, rather than passing the classifications directly to the software developer.

In this regard, the static analysis tool is used in two ways. First, it is used to identify candidate code elements that are to be classified by the LLM, along with contextual information. Second, it is used to consume the classifications produced by the LLM to augment its own static analysis capabilities.

Any type of static analysis tool can be used, and CodeQL is but one example. Indeed, any static analysis tool that can reason about the syntax and semantics of source code, precisely identify candidate code elements, and consume classifications can be used. The static analysis tool is beneficially used to extract candidates and few-shot examples, thereby beneficially limiting the number of calls to the LLM. Such a technique is in contrast with providing all of the code to the LLM. The embodiments also provide a principled framework for eliminating false positives via candidate filtering and surfacing of diverse negative examples. Using a pre-trained LLM also advantageously eliminates the need to build a large training set and to build or maintain a custom model.

Framing the classification as a code completion problem allows the embodiments to use models fine-tuned on code that are as good as larger general-purpose models. However, the disclosed approach generalizes to completion- and chat-based general purpose models by adapting the prompt strategy. Providing explanations in the form of comments on the few-shot examples increases accuracy via a low-cost chain-of-thought approach as well as increasing transparency by providing explanations for the model's classification decisions.

Example Computer/Computer Systems

Figure 4:
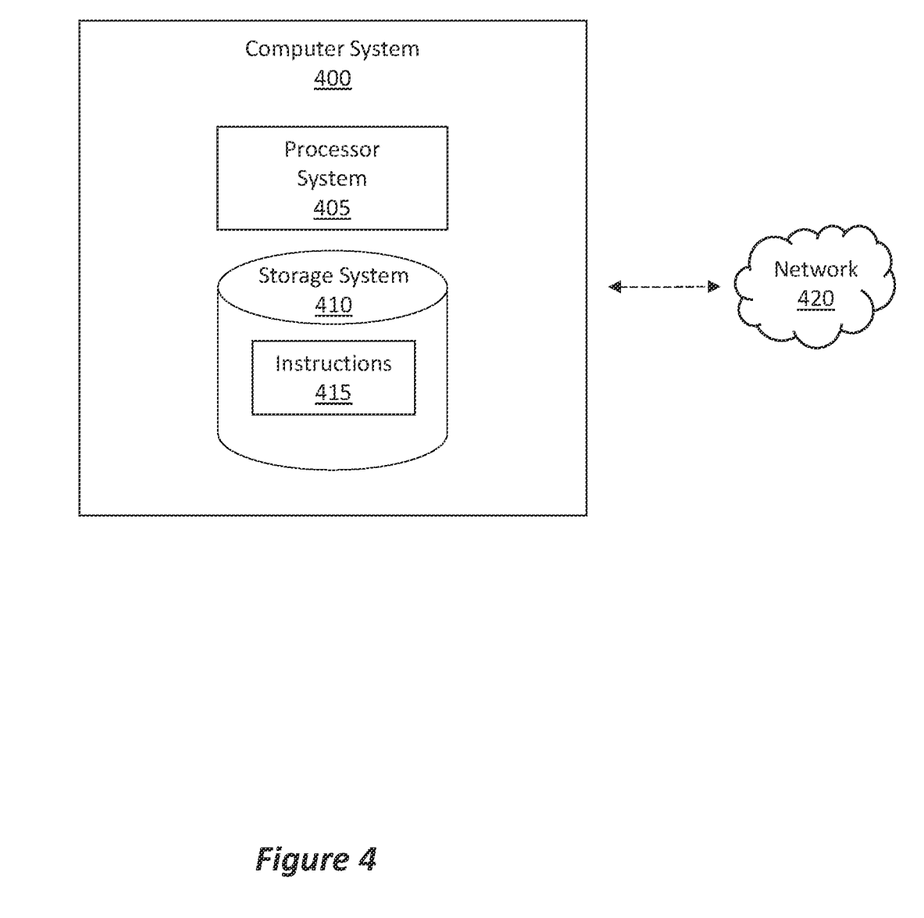
FIG. 4 illustrates an example computer system that can be configured to perform any of the disclosed operations.

Attention will now be directed to FIG. 4, which illustrates an example computer system 400 that may include and/or be used to perform any of the operations described herein. For instance, computer system 400 can implement method 300 of FIG. 3. Similarly, computer system 400 can implement the architecture 100 of FIG. 1.

Computer system 400 may take various different forms. For example, computer system 400 may be embodied as a tablet, a desktop, a laptop, a mobile device, or a standalone device, such as those described throughout this disclosure. Computer system 400 may also be a distributed system that includes one or more connected computing components/devices that are in communication with computer system 400.

In its most basic configuration, computer system 400 includes various different components. FIG. 4 shows that computer system 400 includes a processor system 405 comprising one or more processor(s) (aka a "hardware processing unit") and a storage system 410.

Regarding the processor(s) of the processor system 405, it will be appreciated that the functionality described herein can be performed, at least in part, by one or more hardware logic components. For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "tool," or "engine" can refer to hardware processing units or to software objects, routines, or methods that may be executed on computer system 400. The different components, modules, engines, and services described herein may be implemented as objects or processors that execute on computer system 400 (e.g. as separate threads).

Storage system 410 may include physical system memory, which may be volatile, non-volatile, or some combination of the two. The term "memory" may also be used herein to refer to non-volatile mass storage such as physical storage media. If computer system 400 is distributed, the processing, memory, and/or storage capability may be distributed as well.

Storage system 410 is shown as including executable instructions 415. The executable instructions 415 represent instructions that are executable by the processor(s) of computer system 400 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 400 may also be connected (via a wired or wireless connection) to external sensors (e.g., one or more remote cameras) or devices via a network 420. For example, computer system 400 can communicate with any number devices or cloud services to obtain or process data. In some cases, network 420 may itself be a cloud network. Furthermore, computer system 400 may also be connected through one or more wired or wireless networks to remote/separate computer systems(s) that are configured to perform any of the processing described with regard to computer system 400.

A "network," like network 420, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 400 will include one or more communication channels that are used to communicate with the network 420.

Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for implementing an artificial intelligence (AI) threat modeling tool, said method being performed by a computing service, wherein the computing service is one of a cloud service operating in a cloud environment, a local service operating on a local device, or a hybrid service that includes a cloud component operating in the cloud environment and a local component operating on the local device, said method comprising:
 using a static analysis tool to extract a candidate code snippet from a code repository, wherein the candidate code snippet is identified by the static analysis tool as potentially being a security relevant code element;
 using the static analysis tool to generate additional context associated with the candidate code snippet;
 generating a large language model (LLM) prompt, which is structured to include the candidate code snippet, the context, and a directive to assign a classification to the candidate code snippet, said classification including a source classification, a sink classification, a sanitizer classification, or a flow step classification, and wherein the directive further includes a directive to determine a type for the classification;
 triggering the LLM to operate on the LLM prompt, wherein, as a result of said operating, the LLM generates output comprising a specific classification for the candidate code snippet and a specific type for the specific classification;
 formatting the output of the LLM into one or more data extension files that are consumable by the static analysis tool; and
 including the one or more data extension files in a corpus of data extension files that are consumable by the static analysis tool.

2. The method of claim 1, wherein the context includes one or more few-shot examples.

3. The method of claim 2, wherein the one or more few-shot examples include at least one of: a positive example of a sink, a positive example of a source, a positive example of a sanitizer, or a positive example of a flow step.

4. The method of claim 2, wherein the one or more few-shot examples include at least one of: a negative example of a sink, a negative example of a source, a negative example of a sanitizer, or a negative example of a flow step.

5. The method of claim 1, wherein the context further includes documentation associated with the candidate code snippet.

6. The method of claim 1, wherein the context further includes content extracted from a selected number of code lines preceding a code line comprising the candidate code snippet.

7. The method of claim 1, wherein the context further includes content extracted from a selected number of code lines succeeding a code line comprising the candidate code snippet.

8. The method of claim 1, wherein formatting the output of the LLM into the data extension file includes parsing the output and organizing the parsed output into a format that is consumable by the static analysis tool.

9. The method of claim 1, wherein the candidate code snippet is one of a plurality of candidate code snippets that are identified and extracted by the static analysis tool, and wherein a pre-filtering operation is performed on the plurality of candidate code snippets using a defined set of parameters to reduce a number of candidate code snippets included in the plurality of candidate code snippets.

10. The method of claim 1, wherein the prompt includes details regarding a particular classification provided to a few-shot example that is also included in the prompt.

11. A computer system comprising:
a processor system; and
a storage system that includes instructions that are executable by the processor system to cause the computer system to:
use a static analysis tool to extract a candidate code snippet from a code repository, wherein the candidate code snippet is identified by the static analysis tool as potentially being a security relevant code element;
use the static analysis tool to generate additional context associated with the candidate code snippet;
generate a large language model (LLM) prompt, which is structured to include the candidate code snippet, the context, and a directive to assign a classification to the candidate code snippet, said classification including a source classification, a sink classification, a sanitizer classification, or a flow step classification, and wherein the directive further includes a directive to determine a type for the classification;
trigger the LLM to operate on the LLM prompt, wherein, as a result of said operating, the LLM generates output comprising a specific classification for the candidate code snippet and a specific type for the specific classification;
format the output of the LLM into a data extension file that is consumable by the static analysis tool; and
include the data extension file in a corpus of data extension files that are consumable by the static analysis tool.

12. The computer system of claim 11, wherein the prompt is generated in real-time.

13. The computer system of claim 11, wherein the context includes information obtained from a source that is external to the code repository.

14. The computer system of claim 11, wherein the prompt is a fillable, pre-generated template.

15. The computer system of claim 11, wherein a size of the prompt is limited by a threshold size.

16. The computer system of claim 11, wherein the context includes a plurality of few-shot examples, and wherein a set of the few-shot examples are designed to encourage the LLM to assign negative classification to certain types of candidate code snippets.

17. The computer system of claim 16, wherein one type of candidate code snippet is structured to encourage the LLM to classify a particular candidate code snippet as not being a source or a sink.

18. A method for implementing an artificial intelligence (AI) threat modeling tool, said method being performed by a computing service, wherein the computing service is one of a cloud service operating in a cloud environment, a local service operating on a local device, or a hybrid service that includes a cloud component operating in the cloud environment and a local component operating on the local device, said method comprising:
using a static analysis tool to extract a candidate code snippet from a code repository, wherein the candidate code snippet is identified by the static analysis tool as potentially being a security relevant code element;
using the static analysis tool to generate additional context associated with the candidate code snippet;
generating a large language model (LLM) prompt, which is structured to include the candidate code snippet, the context, and a directive to assign a classification to the candidate code snippet, said classification including a source classification, a sink classification, a sanitizer classification, or a flow step classification;
triggering the LLM to operate on the LLM prompt, wherein, as a result of said operating, the LLM generates output comprising a specific classification for the candidate code snippet; and
formatting the output of the LLM into a data extension file that is consumable by the static analysis tool.

19. The method of claim 18, wherein the prompt is a batch prompt that includes multiple candidate code snippets.

20. The method of claim 18, wherein the prompt further includes natural language instructions.

* * * * *